United States Patent [19]

MacIntyre

[11] Patent Number: 4,832,175
[45] Date of Patent: May 23, 1989

[54] SORTING AND ORIENTING STRUCTURE AND METHOD

[76] Inventor: Archie A. MacIntyre, 4533 Lakeview Dr., Beaverton, Mich. 48612

[21] Appl. No.: 33,250

[22] Filed: Apr. 2, 1987

[51] Int. Cl.⁴ ............................................ B65G 29/00
[52] U.S. Cl. .................... 198/392; 198/396; 221/160
[58] Field of Search ............. 198/392, 397, 396, 398; 221/160, 161

[56] References Cited

U.S. PATENT DOCUMENTS

| 2,609,912 | 9/1952 | Engel | 198/397 |
| 3,070,210 | 12/1962 | Woodward, Jr. | 198/397 |
| 3,684,077 | 8/1972 | MacIntyre | 198/392 |
| 3,860,145 | 1/1975 | Miller | 198/398 X |
| 4,429,808 | 2/1984 | Doty | 198/392 X |

FOREIGN PATENT DOCUMENTS

| 1175604 | 8/1964 | Fed. Rep. of Germany | 198/397 |
| 2217518 | 1/1973 | Fed. Rep. of Germany | 198/396 |
| 2456764 | 6/1976 | Fed. Rep. of Germany | 198/392 |
| 7713298 | 8/1978 | Netherlands | 198/392 |

Primary Examiner—Robert J. Spar
Assistant Examiner—Cheryl L. Gastineau
Attorney, Agent, or Firm—Dale R. Small & Associates

[57] ABSTRACT

Sorting and orienting structure and method. The structure includes a frame, a hopper supported by the frame, conveyor structure extending vertically through the hopper for feeding work pieces from the hopper onto the sorting and orienting table with random orientation, a drive shaft extending through the hopper mounting the table for rotation, a drive motor connected to the drive shaft for directly driving the drive shaft to rotate the table, and sorting and orienting structure surrounding the table for sorting and orienting the work pieces on rotation of the table by returning work pieces having an undersirable orientation back to the hopper and feeding work pieces having a desired orientation away from the sorting and orienting structure. The method comprises feeding work pieces onto a sorting and orienting table with random orientation, directly rotating the sorting and orienting table, returning work pieces having an undesired orientation on the table back to the hopper and feeding work pieces having a desired orientation away from the hopper.

7 Claims, 3 Drawing Sheets

SORTING AND ORIENTING STRUCTURE AND METHOD

BACKGROUND OF THE INVENTION

1. Field of the Invention

The invention relates to sorting and orienting and refers more specifically to a sorting and orienting structure for and a method of sorting and orienting work pieces to be fed to equipment with a specific orientation. The structure comprises a hopper for receiving randomly oriented work pieces, a vertically extending endless elevator for removing work pieces from the hopper and feeding them in series onto a horizontally oriented table for sorting and orienting, drive shaft means for rotatably supporting the sorting and orienting table, means for directly driving the drive shaft means, and means operably associated with the table for sorting and orienting work pieces thereon during rotation of the table. In practicing the method of the invention with the structure of the invention the work pieces are removed from the hopper by the elevator and deposited on the horizontally oriented sorting and orienting table, the sorting and orienting table is rotated, and work pieces having an undesirable orientation are sent back into the hopper while work pieces having a desirable orientation are passed serially from the sorting and orienting structure.

2. Description of the Prior Art

In the past sorting and orienting structures have usually taken the form of vibratory feeders such as bowl feeders or the like. With such prior devices work pieces placed in the vibrating feeders are moved along tracks therein by vibration of the feeders. During such movement they are oriented and/or sorted. Such feeders are relatively complicated and expensive. Further, such vibratory feeders are generally noisy and subject to limitations such as difficulty in feeding parts which are oily.

Wherein sorting and orienting devices and methods have been mechanical in the past they have also been more complicated than necessary and have therefore been more expensive and usually less efficient than desirable. Also some of the mechanical feeding devices of the past have not always been as gentle with the parts to be oriented and sorted as desirable and some of them have required bulk storage at an undesirable height to permit gravity feeding of work pieces thereto. The prior mechanical sorting and orienting structures have also been generally objectionally noisy and have not been as compact as desirable while permitting monitoring of the feed system by a floor level operator.

In addition mechanical sorting and orienting structures of the past have usually been constructed so as to facilitate sorting and orienting specific parts. With such equipment and with the method of operation of such equipment it has been difficult or impossible to utilize the equipment for sorting and orienting different work pieces, particularly for short runs of different work pieces.

SUMMARY OF THE INVENTION

The invention is a sorting and orienting structure and method. In accordance with the invention work pieces having a random orientation in bulk storage are oriented, sorted and fed in line with desired orientation away from the sorting and orienting structure of the invention. The sorting and orienting in accordance with the invention is accomplished with structure having a compact design, a low bulk loading height and few working components. The structure of the invention provides low profile monitoring of the work piece feed system, total responsibility from the bulk storage area to a work station, gentle handling of parts and noise control built into the feeder system. Further, the sorting and orienting structure of the invention requires no add-ons for sorting and orienting of the specific work pieces and the change required for sorting and orienting a wide variety of work pieces is accomplished from separate easily accessable and/or exchangable tool rings.

The structure of the invention includes a frame, a supply hopper, carried by the frame for holding a randomly oriented bulk supply of work pieces to be oriented and sorted, a vertically extending endless conveyor carried by the frame and passing through the hopper having a vertically upwardly movable face exposed to the work pieces in the hopper, a sorting and orienting table positioned adjacent to the vertically extending conveyor over the hopper, drive shaft means for supporting the horizontally oriented table for rotation over the hopper, drive means for directly driving the drive shaft, means to rotate the table, means for feeding the work pieces from the conveyor by gravity onto the sorting and orienting table and means position adjacent to the sorting and orienting table for sorting and orienting the work pieces on rotation of the sorting and orienting table including cam means for returning work pieces having an undesired orientation to the hopper and slot means for permitting the feeding of properly oriented work pieces to a chute for moving them away from the sorting and orienting structure.

The method of the invention includes storing a bulk supply of work pieces to be sorted and oriented, rotating a sorting and orienting table, feeding randomly oriented work pieces onto the rotating sorting and orienting table, camming improperly oriented work pieces from the sorting and orienting table back into the hopper and feeding properly oriented work pieces away from the sorting and orienting table.

DESCRIPTION OF THE PREFERRED EMBODIMENT

Figure 1:
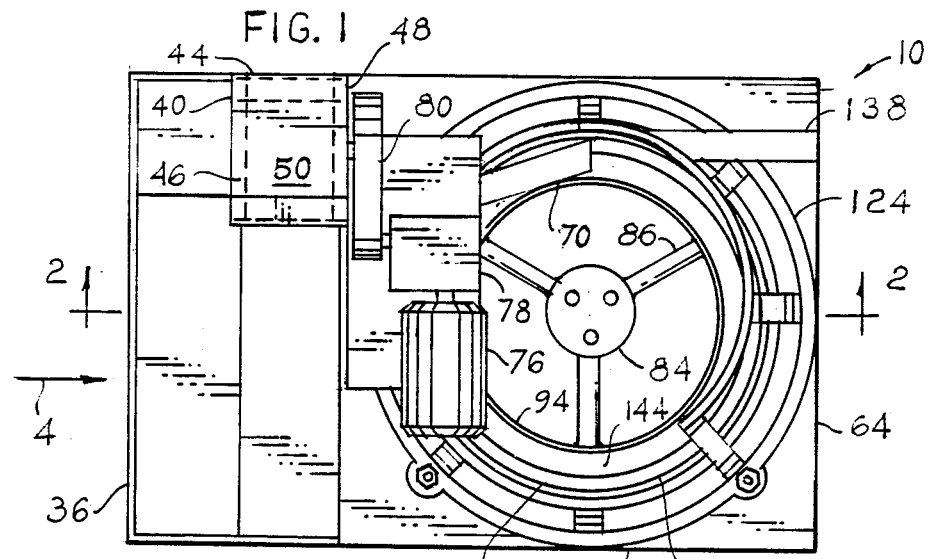
FIG. 1, is a top view of sorting and orienting structure constructed in accordance with the invention for practicing the method of the invention.
Figure 2:
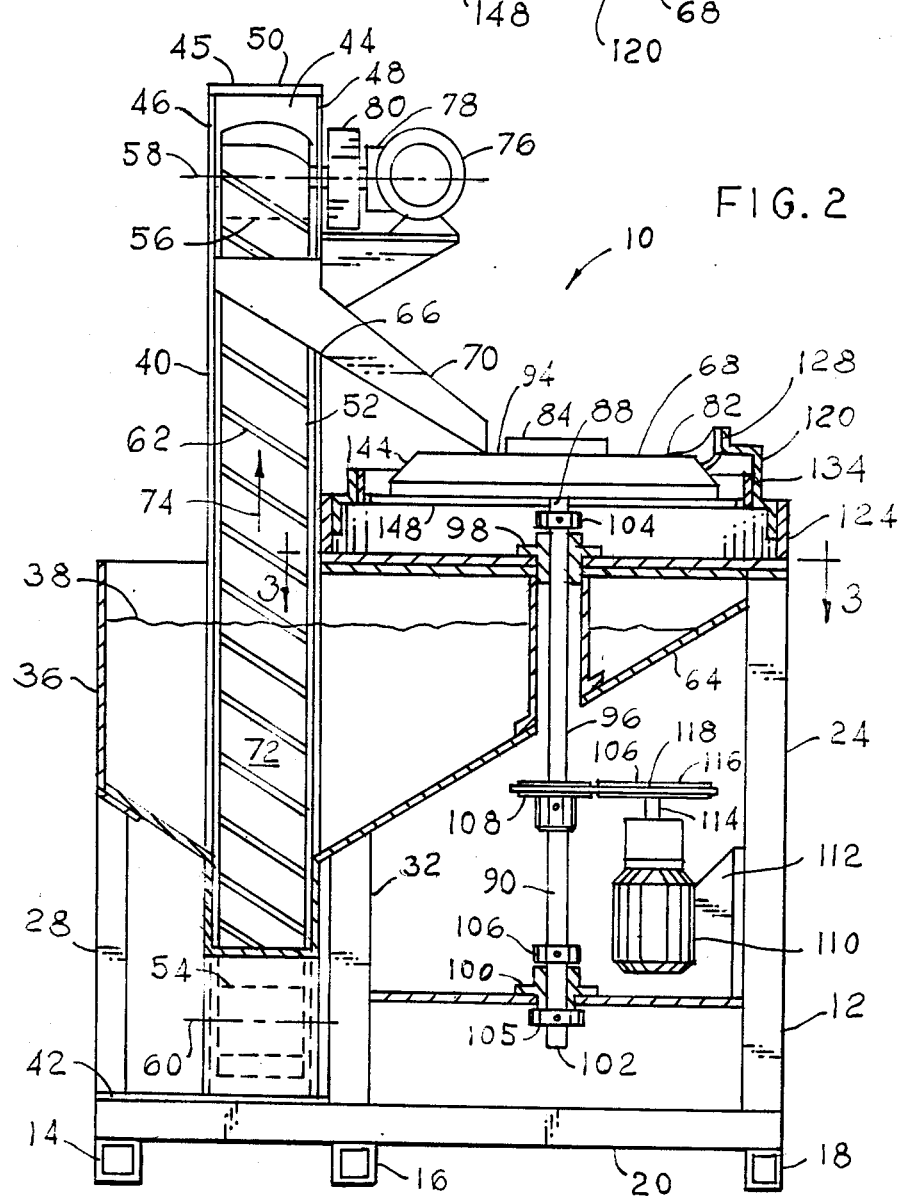
FIG. 2, is a section view of the sorting and orienting structure illustrated in FIG. 1, taken substantially on the line 2—2 in FIG. 1.
Figure 3:
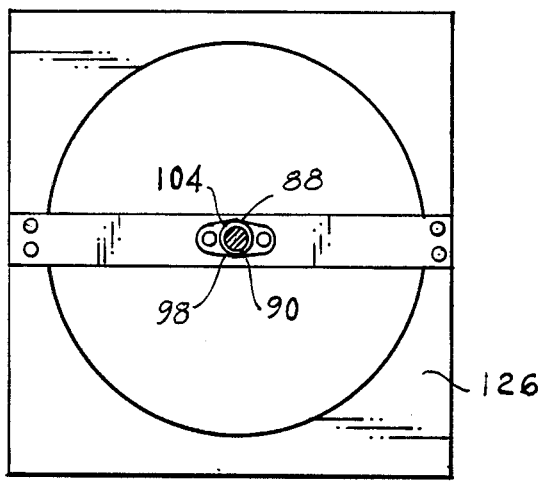
FIG. 3, is a view of the sorting and orienting structure illustrated in FIG. 1, taken substantially on the line 3—3 in FIG. 2.
Figure 4:
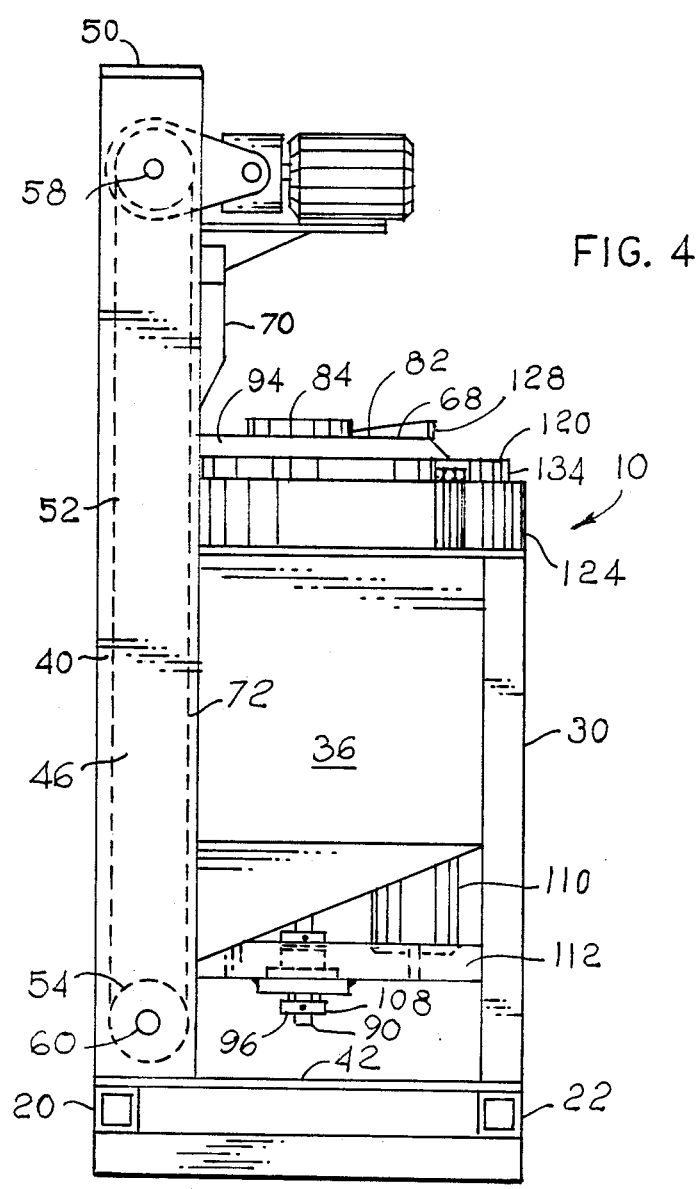
FIG. 4, is an elevation view of the sorting and orienting structure illustrated in FIG. 1, taken substantially in the direction of arrow 4 in FIG. 1.

The sorting and orienting structure 10 of the invention shown best in FIG. 2, includes a metal frame 12 including the crossed horizontally extending metal members 14, 16, 18, 20 and 22 and the vertically extending metal corner posts 24, 26 (not shown), 28 and 30 and intermediate posts 32 and 34 (not shown), respectively. The metal members are tubular and have a square cross section as shown in FIGS. 2 and 4 and may be connected together by convenient means such as welding or the like.

A hopper 36 shaped as shown is formed of sheet metal and is secured to the vertical posts by convenient means such as welding. The hopper 36 as shown provides bulk storage for randomly oriented work pieces 38.

Endless conveyor housing structure 40 is supported on plate 42 extending between the horizontal frame members 20 and 22 and includes three sides 44, 46 and 48 and a top plate 50. An endless conveyor 52 is positioned within the conveyor housing 40 and is rotated on sprockets 54 and 56 positioned on the axes of rotation 58 and 60 and mounted for rotation between the side walls 46 and 48. As shown best in FIG. 2, the endless conveyor has a plurality of shelves 62 thereon which are slanted downwardly toward the end 64 of the hopper 36.

An opening 66 is provided through the wall 48 of the conveyor housing 40 at a height above the sorting and orienting table 68, again as shown best in FIG. 2. Chute 70 is secured to the conveyor housing 40 by convenient means such as welding in a position to receive work pieces carried to the chute on the shelves 62, which work pieces, on passing the opening 66 in the wall 48 of the conveyor housing 40, pass into the chute 70 under the force of gravity to be ultimately deposited on the sorting and orienting table 68. The chute 70 is shaped to receive the work pieces one at a time as they slide linearly off the conveyor shelves 62.

The conveyor 52 is driven by sprocket 56. Sprocket 56 is rotated so as to move the front face 72 of the conveyor 52 upwardly in the direction of arrow 74. Sprocket 56 is rotated by the motor 76 through the slip clutch 78 and the speed reducer 80.

Figure 6:
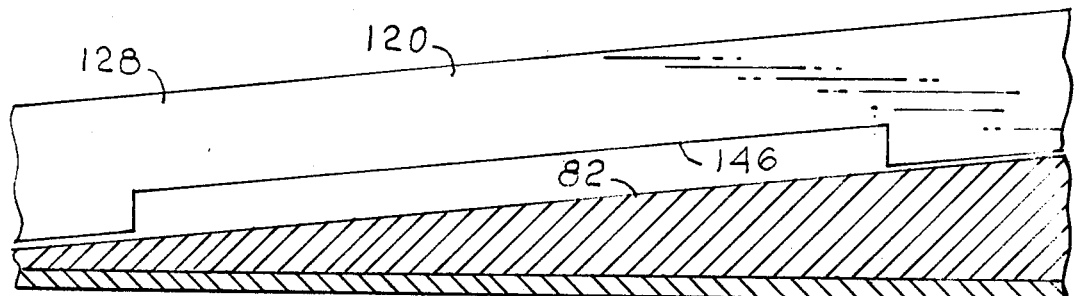
FIG. 6, is a partial section view of the structure illustrated in FIG. 5, taken substantially on the line 6—6 in FIG. 5.

As shown the sorting and orienting table 68 includes an annular ring 82 which has a generally triangular cross section shown best in FIG. 6. The annular ring 82 is secured to the central hub 84 by spokes 86. The hub 84 in turn is rigidly secured to the upper end 88 of the drive shaft 90 as best shown in FIG. 2.

The annular ring 82 of the cross section of the sorting and orienting table 68 can be coated with plastic 94 as shown to minimize noise during the operation of the sorting and orienting structure 10 as desired. Further, the other metal portions of the sorting and orienting structure 10, that is the hopper 36, chute 70, and the sorting and orienting structure to be considered later, may also be coated with a sound deadening material wherein they contact the work pieces to minimize noise in the operation of the sorting and orienting structure 10 as desired.

As shown best in FIG. 2, the drive structure 96 includes the drive shaft 90 and upper bushing 98 and a lower bushing 100 receiving the opposite ends 88 and 102 of the drive shaft 90, and bearings 104, 106 and 105 rotatably supporting the drive shaft 90 in the bushings 98 and 100.

The drive means 106 for rotatably driving the drive shaft 90 to rotate the sorting and orienting table 68 includes the drive wheel 108 secured to the shaft 90 for rotation therewith and the motor 110 secured to the frame 12 by convenient means such as bracket 112. Motor 110 has an output shaft 114 to which a motor drive wheel 116 is secured. Endless flexible drive means such as a drive belt 118 extends around the drive wheels 108 and 116 so that on rotation of the motor 110 the shaft 90 is caused to rotate.

Motor 110 is spring loaded so that on jamming of the sorting and orienting table 68, for example, neither the sorting and orienting table 68 nor any of the rest of the sorting and orienting apparatus will be damaged. In other words, above a certain motor torque, output shaft 114 may held stationary without damage to the sorting and orienting structure 10 including the motor 110.

Figure 5:
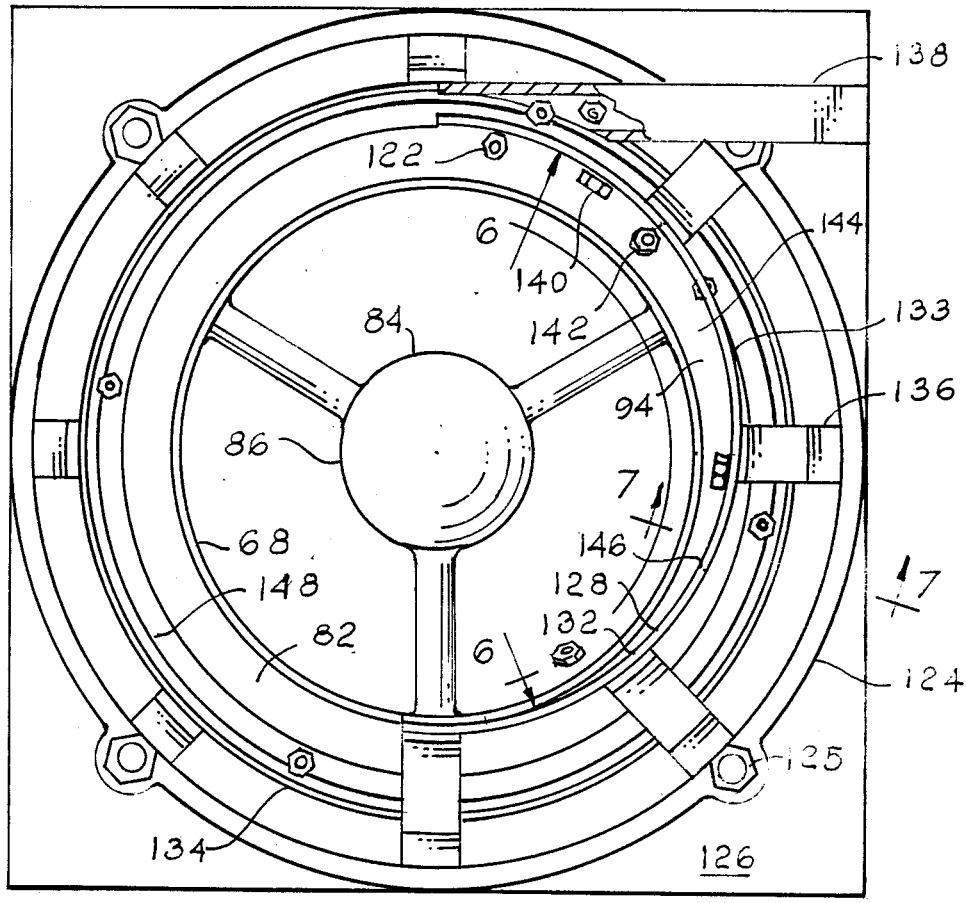
FIG. 5, is an enlarged plan view of the sorting and orienting table of the sorting and orienting structure illustrated in FIGS. 1 through 4 including an exit chute and a tooling ring for sorting and orienting simple work pieces operably associated therewith.

As shown in FIG. 5 the means 120 for sorting and orienting work pieces such as for example hex nuts 122 positioned on the sorting and orienting table 68 with random orientation includes a tooling ring 124 which is secured to the lower plate 126 by four removable bolts 125, an inner guide 128 having a slotted portion 146 and a camming portion 132 thereon and an outer guide 134. The inner and outer guides 128 and 134 are supported from the tooling ring 124 by convenient adjustable bracket structures 136.

In operation of the sorting and orienting structure 10 of the invention a bulk supply of work pieces such as the hex nuts 122 illustrated best in FIG. 5 which it is desired to feed serially to a work place through an exit chute 138 are placed in the hopper 36 through the open top thereof. The conveyor 52 is operated on energizing the motor 76. Individual work pieces in hopper 36 are picked up on the shelves 62 on the front face 72 of the conveyor 52 as it moves upwardly in the direction of arrow 74. The individual work pieces are moved serially down the chute 70 under the force of gravity as the shelves 62 pass the opening 66 in the wall 48 of the conveyor housing 40. The work pieces are thus fed serially onto the sorting and orienting table 62 between the annular ring 82 and the inner guide 128 of the sorting and orienting structure 120.

Figure 7:
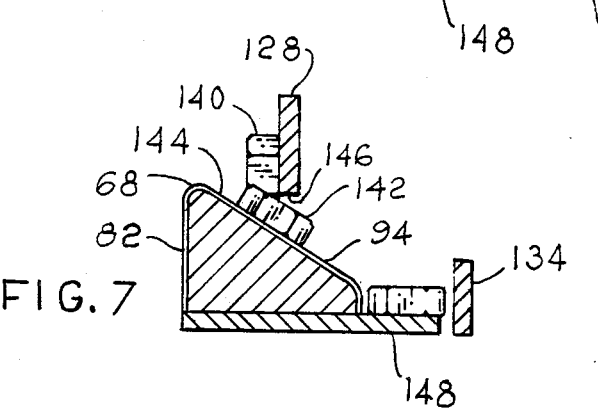
FIG. 7, is a partial cross section view of the sorting and orienting structure illustrated in FIG. 5, taken substantially on the line 7—7 in FIG. 5, and showing work pieces in different position thereon.

At this time the orientation of the work pieces on the sorting and orienting table 68 is random. That is to say some of the work pieces 122 may be in an undesirable, on edge condition, as is the particular work piece 140 shown in FIG. 5. Others will be in a desired position such as the work piece 142 shown best in FIG. 7 lying flat on the surface 144 of the triangular part 82 of the cross section of the sorting and orienting table 68.

As the sorting and orienting table 68 is rotated the work pieces such as work piece 140 which are oriented in an undesirable fashion are either reoriented to lie flat on the surface 144 so that they assume a desirable orientation or are cammed off of the table 68 back into hopper 36 by the inner guide 128. The work piece having the desired orientation such as work piece 142 for example, lie flat on the surface 144, then move past the slot 146 in the inner guide 128, and are moved by centrifugal force through the slot 146 to a position shown in FIG. 7 on the flat annular part 148 of the table 68 between the inner guide 128 and the outer guide 134. Continued movement of the annular table 68 then causes the individual work pieces 122 to be fed linearly from the sorting and orienting table 68 into the exit chute 138.

The serially positioned properly oriented work pieces 122 may be removed from the exit chute 138 by convenient means not shown, and which forms no part of the present invention, and fed to a utilizing device or returned back to the hopper 36 as required.

The sorting and orienting structure thus described has many outstanding features which distinguish the described structure over the prior art. For example, all orienting and selector, cams and wipers are attached to an independent tool mounting ring. This ring can be removed from the system by loosening four nuts 125. This feature allows the sorting and orienting structure of the invention to be adapted to sorting and orienting a variety of different work pieces as well as permitting easy access for routine maintenance. Also as set forth above the sorting and orienting structure as particularly disclosed above is low in profile. This allows for easy bulk loading into the storage hopper as well as sight monitoring by a machine operator.

In addition the sorting and feeding structure disclosed above conveys the work pieces in a steady, smooth and continuous flow. The work pieces progress through the various portions of the sorting and orienting structure as individual pieces and are not therefore subject to mass pressure by other parts seeking orientation. Also, since the individual work piece's progression throgh the sorting and orienting structure 10 does not depend on mass crowding, only a handful of parts are needed to engineer and fabricate the sorting and orienting structure of the invention.

Further, advantages of the sorting and orienting structure as disclosed above includes the plastic coating on all surfaces subject to wear or noise development. The coating may be a one sixteenth of an inch thick bonded covering of urethane.

Also, all major components of the sorting and orienting structure 10 as disclosed above such as bearings, sprockets, motors chains and the like are standard items. Replacements can therefore be obtained from local industrial supply houses.

All roller bearings used in the above disclosed sorting and orienting structure are "sealed for life" greased units. The sorting and orienting table as well as the conveyor have clutch mechanisms associated therewith to protect them. All motors are fractional horse power units complete with control boxes and fuses.

While one embodiment of the invention has been disclosed in detail, it will be understood that other embodiments are contemplated. It is the intention to include all embodiment as are defined by the appended claims within the scope of the invention.

I claim:

1. Sorting and orienting structure comprising a metal frame, a hopper for work pieces to be sorted and oriented supported on the metal frame, a vertically oriented endless conveyor including a conveyor housing, supported on the metal frame and extending through the hopper having a vertically upwardly movable front surface engaged with the work pieces in the hopper including shelves thereon which slant toward one end of the hopper, means for driving the conveyor including motor means and a slip clutch between the motor means and the conveyor, an opening in the side of the conveyor housing adjacent the upper end thereof and in the side toward the one end of the hopper, an annular table positioned in a horizontal orientation over the one end of the hopper, bushing means secured to the frame, a vertically extending drive shaft having opposite ends extending through bushings, the upper end of which is secured to the sorting and orienting table for rotating the table on rotation of the drive shaft, bearing means secured to the drive shaft between the upper end thereof and the upper bushing and adjacent both of the upper and lower ends of the lower bushing, said drive shaft extending through the one end of the hopper and an annular cylindrical sleeve extending through the one end of the hopper surrounding an upper portion of the drive shaft, drive means for rotating the drive shaft comprising a spring loaded drive motor mounted on the frame, a drive wheel secured to the drive shaft centrally thereof for rotation therewith, a drive wheel secured to the output shaft of the spring loaded drive motor and endless linear means extending around the drive wheels for rotation of the drive shaft on actuation of the motor, a chute secured to the conveyor structure extending between the slot in the side of the conveyor structure to the top of the sorting and orienting table for receiving work pieces to be sorted and oriented and passing them through gravity to the sorting and orienting structure and means for sorting and orienting work pieces comprising a tooling ring positioned adjacent the sorting and orienting table periphery including cam means extending over the table for camming work pieces having an undesired orientation back into the hopper and including a slot therein through which work pieces on the work table are moved on rotation of the table and guide means for guiding work pieces so moved into a chute for properly oriented work pieces.

2. Structure as set forth in claim 1, wherein at least the table is coated with plastic to reduce the noise level of operation of the sorting and orienting structure.

3. Sorting and orienting structure comprising a metal frame, a hopper for work pieces to be sorted and oriented supported on the metal frame, a vertically oriented endless conveyor including a conveyor housing, supported on the metal frame and extending through the hopper having a vertically upwardly movable front surface engaged with the work pieces in the hopper including shelves thereon which slant toward one end of the hopper, means for driving the conveyor, an opening in the side of the conveyor housing adjacent the upper end thereof and in the side toward the one end of the hopper, an annular table positioned in a horizontal orientation over the one end of the hopper, upper and lower bushing means secured to the frame, a vertically extending drive shaft having opposite ends extending through the bushings, the upper end of which is secured to the sorting and orienting table for rotating the table on rotation of the drive shaft, said drive shaft also extending through the one end of the hopper, an annular cylindrical sleeve extending through the one end of the hopper surrounding an upper portion of the drive shaft, bearing means secured to the drive shaft between the upper and lower ends of the lower bushing, drive means for rotating the drive shaft, a chute secured to the conveyor structure extending between the slot in the side of the conveyor structure to the top of the sorting and orienting table for receiving work pieces to be sorted and oriented and passing them through gravity to the sorting and orienting structure, and means for sorting and orienting the work pieces.

4. Structure as set forth in claim 3 wherein the means for sorting and orienting work pieces comprises a tooling ring positioned adjacent the sorting and orienting table periphery, including cam means extending over the table for camming work pieces having an undesired orientation back into the hopper and including a slot therein through which work pieces on the work table are moved on rotation of the table and guide means for guiding work pieces so moved into a chute for properly oriented work pieces.

5. Structure as set forth in claim 3 wherein the means for driving the conveyor includes motor means and a slip clutch between the motor means and the conveyor.

6. Structure as set forth in claim 3 wherein the means for rotating the drive shaft comprises a spring loaded drive motor mounted on the frame, a drive wheel secured to the drive shaft centrally thereof for rotation therewith, a drive wheel secured to the output shaft of the spring loaded drive motor and endless linear means extending around the drive wheels for rotation of the drive shaft on actuation of the motor.

7. Structure as set forth in claim 3 wherein at least the table is coated with plastic to reduce the noise level of operation of the sorting and orienting structure.

* * * * *